United States Patent
Clark

(10) Patent No.: US 11,228,081 B1
(45) Date of Patent: Jan. 18, 2022

(54) SOLAR-POWERED SATELLITE DISH HEATER

(71) Applicant: Kelli Clark, Coalville, UT (US)

(72) Inventor: Kelli Clark, Coalville, UT (US)

(*) Notice: Subject to any disclaimer, the term of this patent is extended or adjusted under 35 U.S.C. 154(b) by 259 days.

(21) Appl. No.: 16/589,189

(22) Filed: Oct. 1, 2019

(51) Int. Cl.
| | |
|---|---|
| *H01Q 1/02* | (2006.01) |
| *H01Q 1/28* | (2006.01) |
| *H01Q 19/12* | (2006.01) |
| *H02S 40/38* | (2014.01) |
| *F24S 20/30* | (2018.01) |
| *H01Q 1/22* | (2006.01) |
| *H04B 7/185* | (2006.01) |

(52) U.S. Cl.
CPC ............... *H01Q 1/02* (2013.01); *F24S 20/30* (2018.05); *H01Q 1/22* (2013.01); *H01Q 1/288* (2013.01); *H01Q 19/12* (2013.01); *H02S 40/38* (2014.12); *H04B 7/185* (2013.01)

(58) Field of Classification Search
CPC ............ H01Q 1/02; H01Q 19/12; H01Q 1/22; H01Q 1/288; F24S 20/30; H02S 40/38
See application file for complete search history.

(56) References Cited

U.S. PATENT DOCUMENTS

| | | | |
|---|---|---|---|
| D304,454 S | 11/1989 | Serres | |
| 5,861,855 A | 1/1999 | Arsenault | |
| 5,999,137 A * | 12/1999 | Crosby | .................... H01Q 9/26 343/725 |
| 7,508,351 B2 | 3/2009 | Greenleaf | |
| 8,305,278 B2 | 11/2012 | Corn | |
| 8,872,710 B2 | 10/2014 | Wallace | |
| 10,084,226 B2 | 9/2018 | Mellias | |
| 2004/0113859 A1 * | 6/2004 | Benco | .................. H01Q 19/021 343/840 |
| 2008/0007470 A1 | 1/2008 | Ward | |
| 2010/0328167 A1 | 12/2010 | Stephens | |
| 2017/0222296 A1 * | 8/2017 | Mellas | ................... H01Q 15/16 |

FOREIGN PATENT DOCUMENTS

EP        2273607        3/2013

* cited by examiner

*Primary Examiner* — Dieu Hien T Duong

(57) ABSTRACT

The solar-powered satellite dish heater is configured for use with a satellite dish. The satellite dish is an antenna that is configured to receive radio frequency transmissions from a satellite. The solar-powered satellite dish heater is a heating device that prevents an accumulation of ice from inhibiting the satellite dish from receiving the radio frequency transmissions from the satellite. The solar-powered satellite dish heater comprises the satellite dish and a heating structure. The heating structure generates heat that is transferred to the satellite dish such that any ice that has accumulated on the satellite dish will melt.

17 Claims, 5 Drawing Sheets

SOLAR-POWERED SATELLITE DISH HEATER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electricity and basic electric elements including antennas, more specifically, a deicing arrangement for an antenna. (H01Q1/02)

SUMMARY OF INVENTION

The solar-powered satellite dish heater is configured for use with a satellite dish. The satellite dish is an antenna that is configured to receive radio frequency transmissions from a satellite. The solar-powered satellite dish heater is a heating device that prevents an accumulation of ice from inhibiting the satellite dish from receiving the radio frequency transmissions from the satellite. The solar-powered satellite dish heater comprises the satellite dish and a heating structure. The heating structure generates heat that is transferred to the satellite dish such that any ice that has accumulated on the satellite dish will melt.

These together with additional objects, features and advantages of the solar-powered satellite dish heater will be readily apparent to those of ordinary skill in the art upon reading the following detailed description of the presently preferred, but nonetheless illustrative, embodiments when taken in conjunction with the accompanying drawings.

In this respect, before explaining the current embodiments of the solar-powered satellite dish heater in detail, it is to be understood that the solar-powered satellite dish heater is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the solar-powered satellite dish heater.

It is therefore important that the claims be regarded as including such equivalent construction insofar as they do not depart from the spirit and scope of the solar-powered satellite dish heater. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
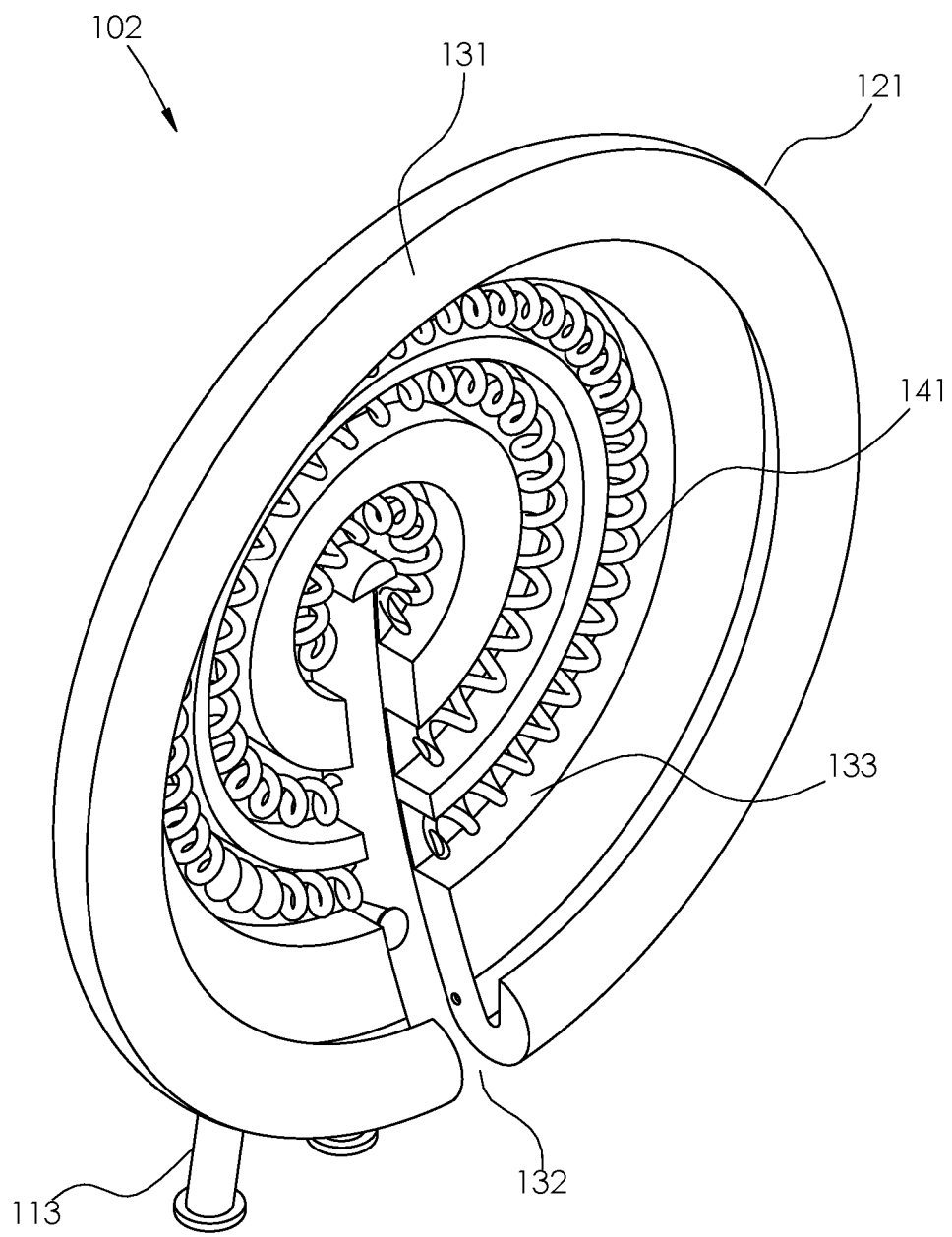
FIG. 1 is a perspective view of an embodiment of the disclosure.
Figure 2:
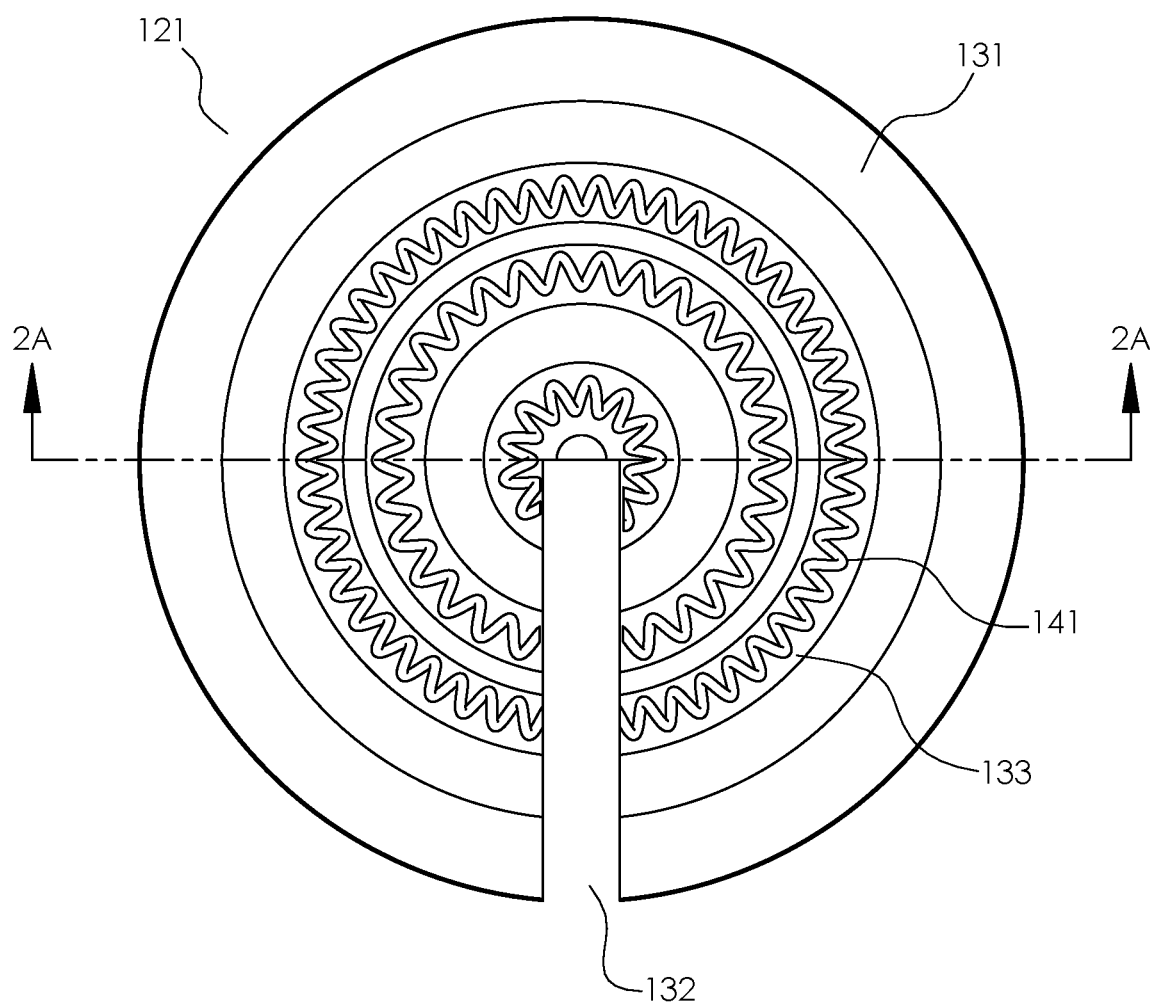
FIG. 2 is a front view of an embodiment of the disclosure.
Figure 2A:
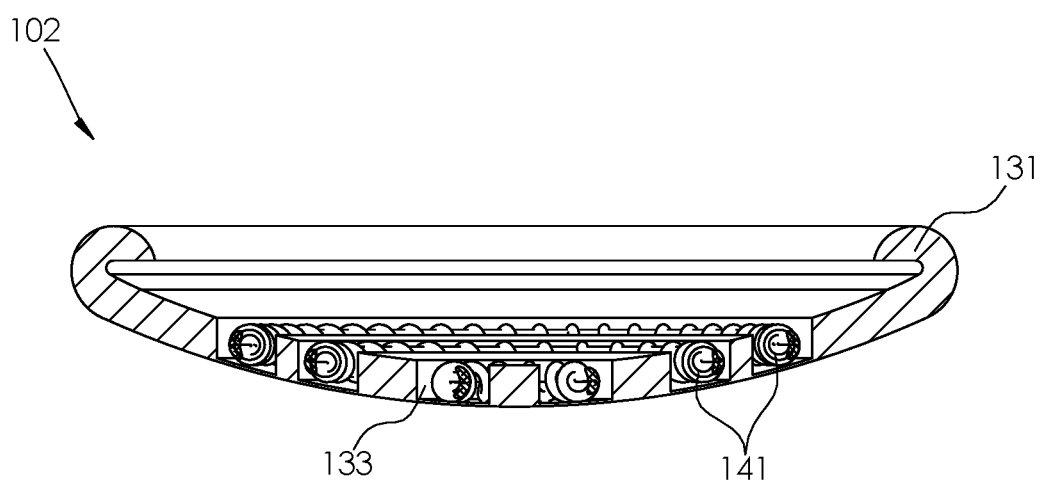
FIG. 2A is a cross-sectional view of an embodiment of the disclosure across 2A-2A as shown in FIG. 2.
Figure 3:
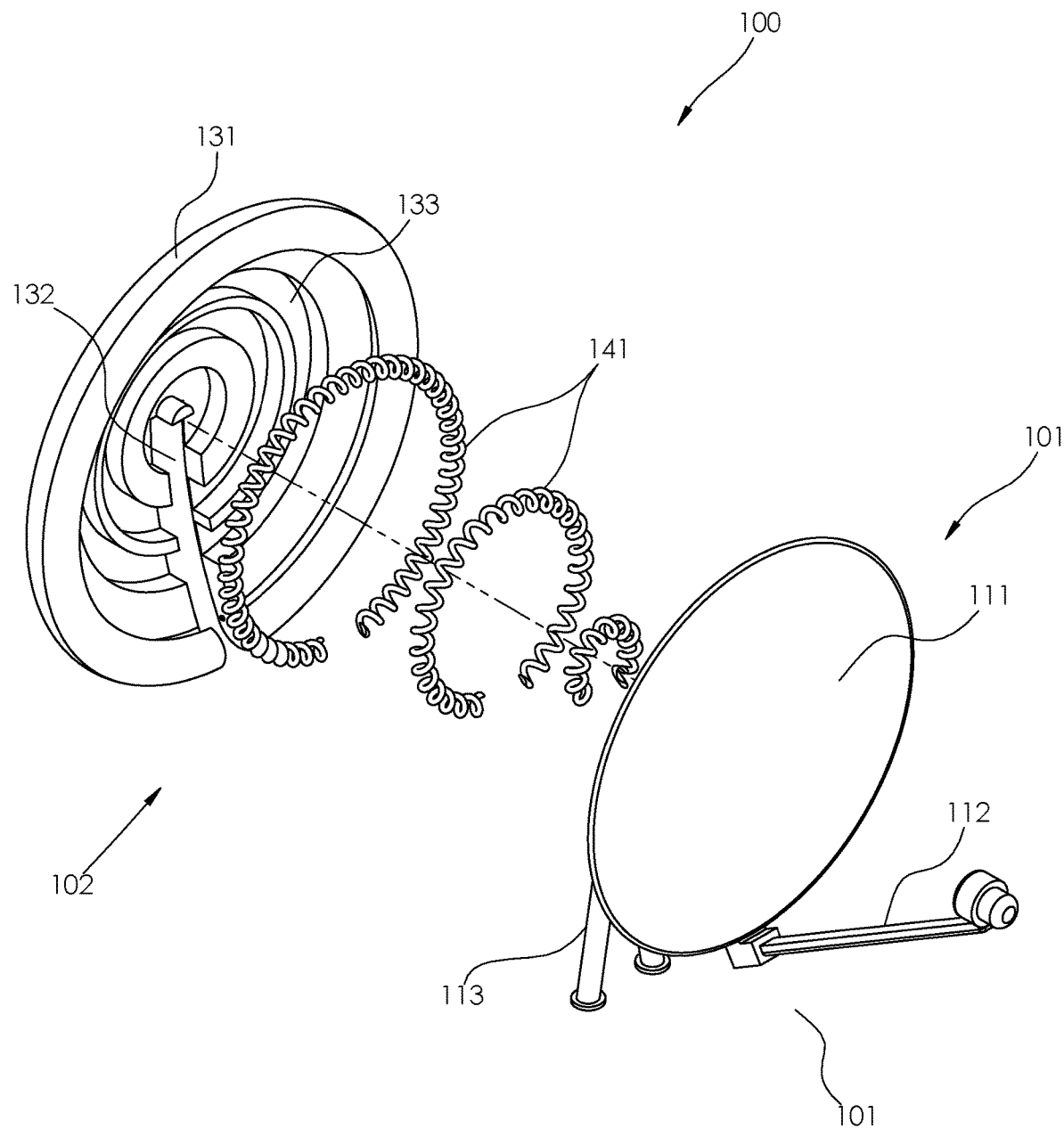
FIG. 3 is an exploded view of an embodiment of the disclosure.
Figure 4:
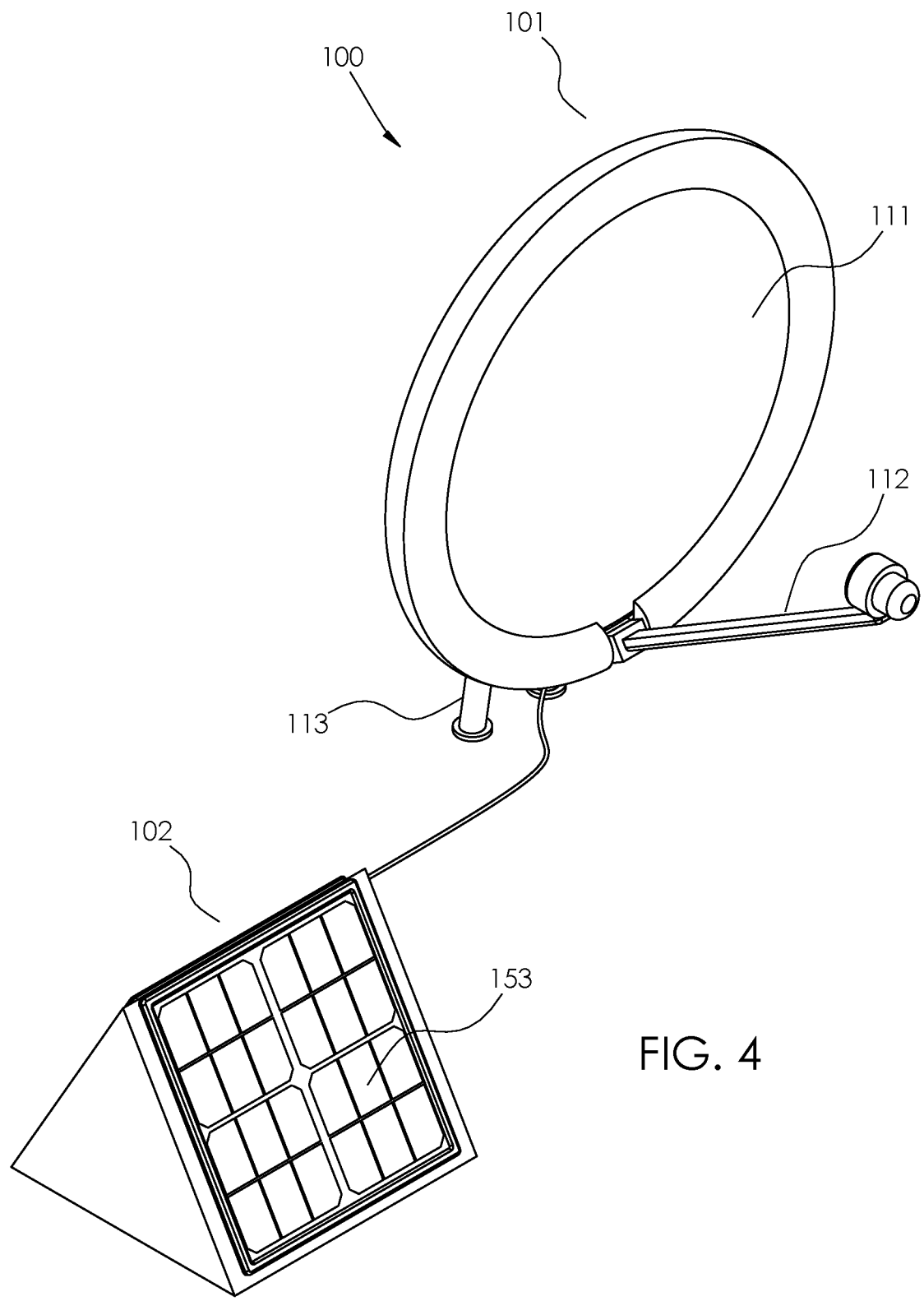
FIG. 4 is an in-use view of an embodiment of the disclosure.
Figure 5:
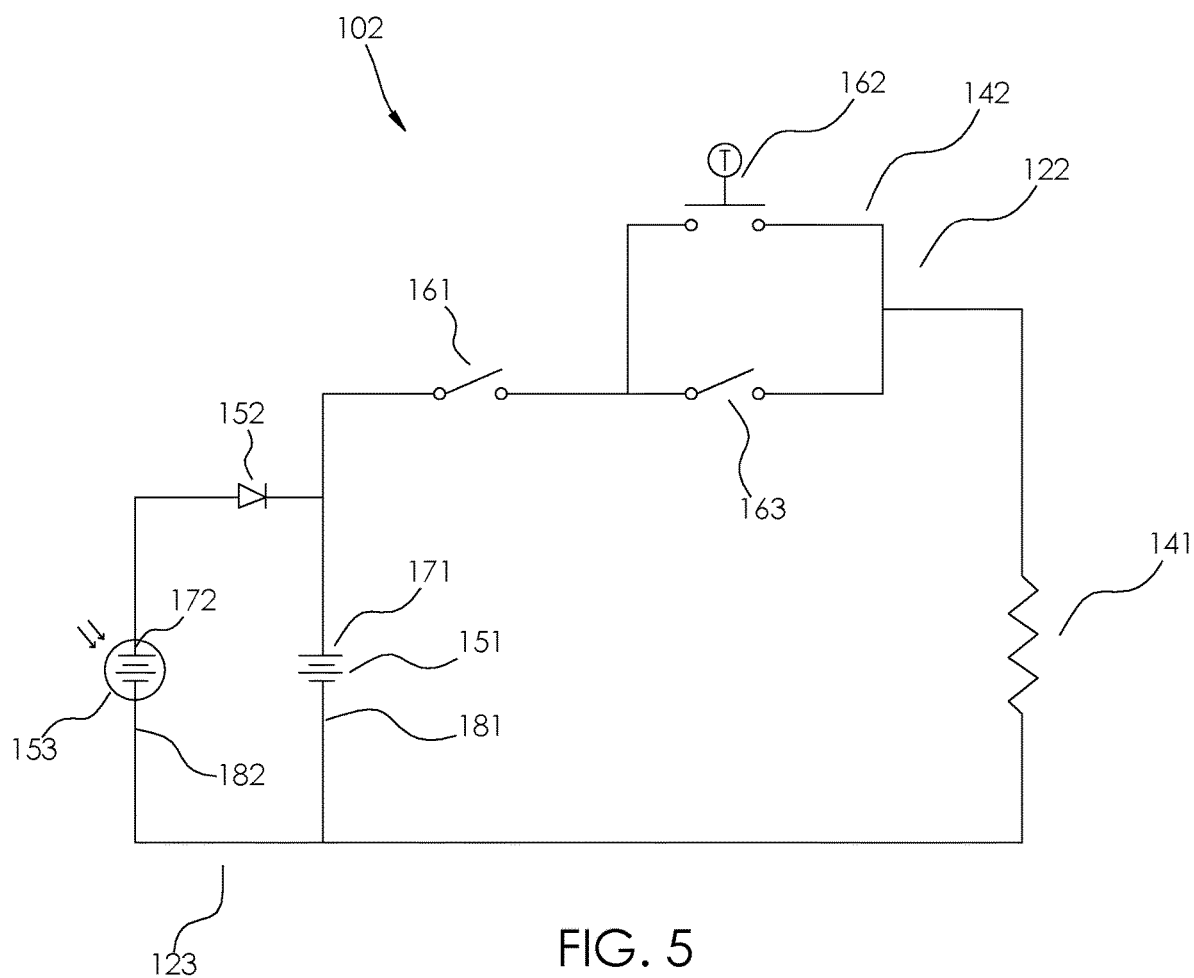
FIG. 5 is a schematic view of an embodiment of the disclosure.

Detailed reference will now be made to one or more potential embodiments of the disclosure, which are illustrated in FIGS. 1 through 5.

The solar-powered satellite dish heater 100 (hereinafter invention) is configured for use with a satellite dish 101. The satellite dish 101 is an antenna that is configured to receive radio frequency transmissions from a satellite. The invention is a heating device that prevents an accumulation of ice from inhibiting the satellite dish 101 from receiving the radio frequency transmissions from the satellite. The invention 100 comprises the satellite dish 101 and a heating structure 102. The heating structure 102 generates heat that is transferred to the satellite dish 101 such that any ice that has accumulated on the satellite dish 101 will melt.

The satellite dish 101 is an antenna. The satellite dish 101 receives radio frequency signals from a satellite. The primary shape of the satellite dish 101 has a bifurcated paraboloid structure. The design and use of a satellite dish 101 are well-known and documented in the electrical and telecommunication arts. The satellite dish 101 comprises a reflector 111, an LNB downconverter 112, and a satellite dish mount 113.

The reflector 111 is a bifurcated paraboloid structure. The reflector 111 reflects and focuses the radio frequency signals received from a satellite towards a focal point where the LNB downconverter 112 is located.

The LNB downconverter 112 is a transducer. The LNB downconverter 112 converts the radio frequency electromagnetic waves focused on the LNB downconverter 112 into an electric signal that is fed into an externally provided receiver.

The satellite dish 101 mount 113 is a mechanical device that attaches the satellite dish 101 to a supporting structure. The satellite dish 101 mount 113 attaches the satellite dish 101 into a fixed position that allows the satellite dish 101 to focus on the appropriate satellite.

The heating structure 102 is an electrical device. The heating structure 102 is a photoelectric device. The heating structure 102 generates the heat used to melt off any ice that accumulates on the satellite dish 101. The heating structure attaches to the convex surface of the bifurcated paraboloid structure of the satellite dish 101 such that the use of the heating structure 102 will not interfere with the use of the satellite dish 101 as an antenna. The heating structure 102 comprises a shell 121, a control circuit 122, and a power circuit 123. The control circuit 122 and the power circuit 123 mount in the shell 121.

The shell 121 is a mechanical structure. The shell 121 has a bifurcated paraboloid structure. The shape of the shell 121 is geometrically similar to the shape of the reflector 111 of the satellite dish 101 such that the convex surface of the reflector 111 of the satellite dish 101 fits flush in the convex surface of the bifurcated paraboloid structure of the shell 121. The shell 121 is secured to the convex surface of the reflector 111 such that the heat generated by the shell 121 warms the reflector 111 of the satellite dish 101. The shell 121 comprises a reflector 111 cover 131, a satellite dish 101 mount 113 slot 132, and a heating element 141 mount 133.

The reflector 111 cover 131 is a bifurcated paraboloid structure. The reflector 111 cover 131 is geometrically similar to the shape of the reflector 111. The reflector 111 cover 131 is formed such that the convex surface of the reflector 111 fits flush into the concave surface of the reflector 111 cover 131.

The satellite dish 101 mount 113 slot 132 is a negative space formed into the reflector 111 cover 131. The satellite dish 101 mount 113 slot 132 allows the reflector 111 cover 131 to slide over the convex surface of the reflector 111 of the satellite dish 101 such that the reflector 111 cover 131 will fit around the satellite dish 101 mount 113 as the reflector 111 cover 131 is placed on the reflector 111.

The heating element 141 mount 133 is a slot that is formed in the concave surface of the bifurcated paraboloid structure of the reflector 111 cover 131. The heating element 141 mount 133 forms the negative space within the reflector 111 cover 131 in which the heating element 141 of the control circuit 122 mounts. The heating element 141 mount 133 is positioned within the reflector 111 cover 131 such that the heat generated by the heating element 141 is transferred directly to the convex surface of the reflector 111 to which the reflector 111 cover attaches.

The control circuit 122 is an electric circuit. The control circuit 122 generates the heat used to melt ice off of the reflector 111 of the satellite dish 101. The control circuit 122 controls the operation of the heating structure 102 such that the control circuit 122: a) heats the reflector 111 when the temperature falls below a previously determined temperature; and, b) discontinues heating the reflector 111 when the temperature rises above the previously determined temperature. The control circuit 122 comprises a heating element 141 and a switching circuit 142.

The heating element 141 is an electrical device. The heating element 141 is a resistive device. The flow of electricity through the heating element 141 generates the heat released from the heating structure 102 into the reflector 111 of the satellite dish 101.

The switching circuit 142 is an electric circuit. The switching circuit 142 is a switching device. The switching circuit 142 controls the flow of electricity from the power circuit 123 into the heating element 141. The switching circuit 142 comprises a master switch 161, a thermostat 162, and a bypass switch 163.

The thermostat 162 is a switching device. The thermostat 162 measures the temperature of the reflector 111 of the satellite dish 101. The thermostat 162 actuates a switch to a closed position when the measured temperature of the reflector 111 falls below a previously determined temperature. The thermostat 162 actuates a switch to an open position when the measured temperature of the reflector 111 climbs above the previously determined temperature. The thermostat 162 controls the flow of electricity from the master switch 161 to the heating element 141 such that the heating element 141 heats the reflector 111 when the measured temperature of the reflector 111 falls below the previously determined temperature.

The bypass switch 163 is a maintained switch. The bypass switch 163 is wired in parallel with the switching element of the thermostat 162. The bypass switch 163 allows for the flow of electricity from the master switch 161 into the heating element 141 when the master switch 161 is in the closed position. The master switch 161 is wired in series with the parallel circuit construction of the thermostat 162 and the bypass switch 163.

The master switch 161 is an electric circuit component. The master switch 161 is a maintained switch. The master switch 161 controls the flow of electricity from the battery 151 of the power circuit 123 into the thermostat 162. The master switch 161 controls the flow of electricity from the battery 151 of the power circuit 123 into the bypass switch 163. The master switch is effectively the power switch of the invention 100.

The power circuit 123 is an electric circuit. The power circuit 123 is an electrochemical device. The power circuit 123 is a photoelectric device. The power circuit 123 generates the electrical energy required to operate the control circuit 122. The power circuit 123 converts electromagnetic radiation into electrical energy. The power circuit 123 stores the received electrical energy into a chemical potential energy. The power circuit 123 converts the stored chemical energy back into electrical energy that is consumed by the control circuit 122 during the process of heating the reflector 111 of the satellite dish 101. The power circuit 123 comprises a battery 151, a diode 152, and a photovoltaic cell 153. The battery 151 is further defined with a first positive terminal 171 and a first negative terminal 181. The photovoltaic cell 153 is further defined with a second positive terminal 172 and a second negative terminal 182.

The battery 151 is an electrochemical device. The battery 151 converts chemical potential energy into the electrical energy used to power the control circuit 122. The battery 151 is a commercially available rechargeable battery 151. The chemical energy stored within the rechargeable battery 151 is renewed and restored through the use of the photovoltaic cell 153. The photovoltaic cell 153 is an electrical circuit that reverses the polarity of the rechargeable battery 151 and provides the energy necessary to reverse the chemical processes that the rechargeable battery 151 initially used to generate the electrical energy. This reversal of the chemical process creates the chemical potential energy that will later be used by the rechargeable battery 151 to generate electricity.

The diode 152 is an electrical device that allows current to flow in only one direction. The diode 152 installs between the rechargeable battery 151 and the charging port YYY such that electricity will not flow from the first positive terminal 171 of the rechargeable battery 151 into the second positive terminal 172 of the photovoltaic cell 153.

The photovoltaic cell 153 is an electrical device. The photovoltaic cell 153 converts electromagnetic radiation into an electric current that transfers electrical energy into the battery 151 for conversion into chemical potential energy.

The following definitions were used in this disclosure:

Antenna: As used in this disclosure, an antenna is an electrical apparatus used to: a) convert electrical current into electromagnetic radiation; and, b) convert electromagnetic radiation into electrical current. An antenna is a type of transducer.

Battery: As used in this disclosure, a battery is a chemical device consisting of one or more cells, in which chemical energy is converted into electricity and used as a source of power. Batteries are commonly defined with a positive terminal and a negative terminal.

Bifurcate: As used in this disclosure, to bifurcate means to divide an object or space into two pieces or segments.

Concave: As used in this disclosure, concave is used to describe: 1) a surface that resembles the interior surface of a sphere; or, 2) a function with a curvature structure wherein a chord that connects any two points of the function will be lesser than (graphically below) or equal to the value of the function at any point along the chord.

Convex: As used in this disclosure, convex is used to describe: 1) a surface that resembles the outer surface of a sphere; or, 2) a function with a curvature structure wherein a chord that connects any two points of the function will be greater than (graphically above) or equal to the value of the function at any point along the chord.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Flush: As used in this disclosure, the term flush is used to describe the alignment of a first surface and a second surface on a single plane.

Heating Element: As used in this disclosure, a heating element is a resistive wire that is used to convert electrical energy into heat. Common metal combinations used to form heat elements include a combination of nickel and Chromium (typical: 80/20), a combination of iron, chromium and aluminum (typical 70/25/5), a combination of copper, nickel, iron, and manganese (typical 66/30/2/2) (use for continuously hot), and platinum.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. Always use Correspond and One to One Maintained Switch: A used in this disclosure, a maintained switch is a switch that maintains the position that was set in the most recent switch actuation. A maintained switch works in an opposite manner to a momentary switch.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Paraboloid: As used in this disclosure, a paraboloid is a type of quadric surface. An elliptic paraboloid is described by the equation: $(x^2/a^2)+(y^2/b^2)=z$. The hyperbolic paraboloid is described by the equation: $(x^2/a^2)-(y^2/b^2)=z$. A paraboloid of rotation refers to an elliptic paraboloid where $a=b$. Unless stated otherwise within the specification, the use of the term paraboloid refers to an elliptic paraboloid.

Parallel Circuit: As used in this disclosure, a parallel circuit refers to a method of electrically connecting a plurality of circuit elements to a voltage source. In a parallel circuit each circuit element receives a voltage equal to the full voltage produced by the voltage source.

Photoelectric: As used in this disclosure, photoelectric is an adjective used to describe an electronic component in which the performance of the electronic component is modified by light. Typical photoelectric devices include, but are not limited to, photoelectric transistors, photoelectric diodes, and photoelectric resistors.

Photovoltaic Cell: As used in this disclosure, a photovoltaic cell is a photoelectric device that directly converts light energy into electrical energy.

Quadric Surface: As used in this disclosure, a quadric surface is a three-dimensional surface that varies in the three Cartesian coordinates in an algebraically defined manner. The conic section is a two-dimensional embodiment of a quadric surface. Euclidian planes as well as the surfaces of ellipsoids, spheres, paraboloids, and cones are examples of quadric surfaces. The Euclidian plane is technically considered a degenerate form of a quadric surface but, unless specifically stated otherwise within this disclosure, is explicitly included in this definition. Quadric surfaces are described by the general algebraic form: $Ax^2+By^2+Cz^2+Dxy+Exz+Fyz+Gx+Hy+Iz+J=0$.

Receiver: As used in this disclosure, a receiver is an electric device that is used to receive and demodulate electromagnetic radiation such as radio signals.

Series Circuit: As used in this disclosure, a series circuit refers to a method of electrically connecting a plurality of circuit elements to a voltage source. In a series circuit, the proportion of the voltage received by each individual circuit element is divided proportionally between the plurality circuit elements based on the resistance (or impedance) of each circuit element relative to the total resistance of the plurality of circuit elements. The series circuit forms a linear or loop structure often referred to as a daisy chain.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Thermostat: As used in this disclosure, a thermostat is a device that monitors the temperature of a space such that the thermostat 1) operates a switch when the measured temperature exceeds or falls below a first preset temperature; and, 2) performs the opposite operation on the switch when the measured temperature falls below or exceeds a second preset temperature. The thermostat is well-known and documented in the electrical arts.

Transducer: As used in this disclosure, a transducer is a device that converts a physical quantity, such as pressure or brightness into an electrical signal or a device that converts an electrical signal into a physical quantity.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A solar-powered satellite dish heater comprising
a satellite dish and a heating structure;
wherein the solar-powered satellite dish heater is a heating device that prevents an accumulation of ice from inhibiting the satellite dish from receiving the radio frequency transmissions from the satellite;
wherein the satellite dish is an antenna that is configured to receive radio frequency transmissions from a satellite;
wherein the heating structure generates heat that is transferred to the satellite dish such that any ice that has accumulated on the satellite dish will melt;
wherein the satellite dish comprises a reflector, an LNB downconverter, and a satellite dish mount;
wherein the heating structure comprises a shell and a control circuit;
wherein the control circuit comprises a heating element;
wherein the reflector is a bifurcated paraboloid structure;
wherein the reflector reflects and focuses the radio frequency signals received from a satellite towards a focal point where the LNB downconverter is located;
wherein the satellite dish mount is a mechanical device that attaches the satellite dish to a supporting structure;
wherein the shell comprises a reflector cover, a satellite dish mount slot, and a heating element mount;
wherein the satellite dish mount slot and the heating element mount are formed in the reflector cover;
wherein the reflector cover is a bifurcated paraboloid structure; wherein the reflector cover is geometrically similar to the shape of the reflector;
wherein the reflector cover is formed such that a convex surface of the reflector fits flush into a concave surface of the reflector cover;
wherein the satellite dish mount slot is a negative space formed into the reflector cover;
wherein the satellite dish mount slot allows the reflector cover to slide over the convex surface of the reflector of the satellite dish such that the reflector cover will fit around the satellite dish mount as the reflector cover is placed on the reflector;
wherein the heating element mount is a slot that is formed in the concave surface of the bifurcated paraboloid structure of the reflector cover;
wherein the heating element mount forms the negative space within the reflector cover in which the heating element of the control circuit mounts; wherein the heating element mount is positioned within the reflector cover such that the heat generated by the heating element is transferred directly to the convex surface of the reflector to which the reflector cover attaches.

2. The solar-powered satellite dish heater according to claim 1 wherein the primary shape of the satellite dish has a bifurcated paraboloid structure.

3. The solar-powered satellite dish heater according to claim 2
wherein the heating structure is an electrical device;
wherein the heating structure is a photoelectric device;
wherein the heating structure generates the heat used to melt off any ice that accumulates on the satellite dish.

4. The solar-powered satellite dish heater according to claim 3 wherein the heating structure attaches to the convex surface of the bifurcated paraboloid structure of the satellite dish.

5. The solar-powered satellite dish heater according to claim 4 wherein the heating structure comprises a power circuit; wherein the control circuit and the power circuit mount in the shell.

6. The solar-powered satellite dish heater according to claim 5
wherein the LNB downconverter is a transducer;
wherein the LNB downconverter converts the radio frequency electromagnetic waves focused on the LNB downconverter into an electric signal;
wherein the satellite dish mount attaches the satellite dish into a fixed position that allows the satellite dish to focus on the appropriate satellite.

7. The solar-powered satellite dish heater according to claim 6
wherein the shell is a mechanical structure;
wherein the shell has a bifurcated paraboloid structure;
wherein the shape of the shell is geometrically similar to the shape of the reflector of the satellite dish such that the convex surface of the reflector of the satellite dish fits flush in the convex surface of the bifurcated paraboloid structure of the shell.

8. The solar-powered satellite dish heater according to claim 7 wherein the shell is secured to the convex surface of the reflector such that the heat generated by the shell warms the reflector of the satellite dish.

9. The solar-powered satellite dish heater according to claim 8
wherein the control circuit is an electric circuit;
wherein the control circuit generates the heat used to melt ice off of the reflector of the satellite dish;
wherein the control circuit controls the operation of the heating structure such that the control circuit: a) heats the reflector; and, b) discontinues heating the reflector.

10. The solar-powered satellite dish heater according to claim 9
wherein the power circuit is an electric circuit;
wherein the power circuit is an electrochemical device;
wherein the power circuit is a photoelectric device;
wherein the power circuit generates the electrical energy required to operate the control circuit;

wherein the power circuit converts electromagnetic radiation into electrical energy;
wherein the power circuit stores the received electrical energy into a chemical potential energy.

11. The solar-powered satellite dish heater according to claim 10 wherein the control circuit comprises a switching circuit; wherein the heating element and the switching circuit are electrically connected.

12. The solar-powered satellite dish heater according to claim 11
wherein the power circuit comprises a battery, a diode, and a photovoltaic cell;
wherein the battery, the diode, and the photovoltaic cell are electrically interconnected;
wherein the battery is further defined with a first positive terminal and a first negative terminal;
wherein the photovoltaic cell is further defined with a second positive terminal and a second negative terminal.

13. The solar-powered satellite dish heater according to claim 12
wherein the heating element is an electrical device;
wherein the heating element is a resistive device;
wherein the flow of electricity through the heating element generates the heat released from the heating structure into the reflector of the satellite dish;
wherein the switching circuit is an electric circuit;
wherein the switching circuit is a switching device;
wherein the switching circuit controls the flow of electricity from the power circuit into the heating element.

14. The solar-powered satellite dish heater according to claim 13
wherein the switching circuit comprises a master switch, a thermostat, and a bypass switch;
wherein the bypass switch is wired in parallel with the switching element of the thermostat;
wherein the master switch is wired in series with the parallel circuit construction of the thermostat and the bypass switch.

15. The solar-powered satellite dish heater according to claim 14
wherein the thermostat is a switching device;
wherein the thermostat measures the temperature of the reflector of the satellite dish;
wherein the thermostat actuates a switch to a closed position when the measured temperature of the reflector falls below a previously determined temperature;
wherein the thermostat actuates a switch to an open position when the measured temperature of the reflector climbs above the previously determined temperature;
wherein the thermostat controls the flow of electricity from the master switch to the heating element such that the heating element heats the reflector when the measured temperature of the reflector falls below the previously determined temperature;
wherein the bypass switch is a maintained switch;
wherein the bypass switch allows for the flow of electricity from the master switch into the heating element when the master switch is in the closed position.

16. The solar-powered satellite dish heater according to claim 15
wherein the master switch is an electric circuit component;
wherein the master switch is a maintained switch;
wherein the master switch controls the flow of electricity from the battery of the power circuit into the thermostat;
wherein the master switch controls the flow of electricity from the battery of the power circuit into the bypass switch.

17. The solar-powered satellite dish heater according to claim 16
wherein the battery is an electrochemical device;
wherein the battery is a rechargeable battery;
wherein the photovoltaic cell is an electrical device;
wherein the photovoltaic cell converts electromagnetic radiation into an electric current that transfers electrical energy into the battery for conversion into chemical potential energy;
wherein the photovoltaic cell is an electrical circuit that reverses the polarity of the rechargeable battery and provides the energy necessary to reverse the chemical processes that the rechargeable battery initially used to generate the electrical energy;
wherein the diode is an electrical device that allows current to flow in only one direction;
wherein the diode installs between the rechargeable battery and the photovoltaic cell such that electricity will not flow from the first positive terminal of the rechargeable battery into the second positive terminal of the photovoltaic cell.

\* \* \* \* \*